United States Patent
Wang et al.

(10) Patent No.: US 10,446,938 B1
(45) Date of Patent: Oct. 15, 2019

(54) RADAR SYSTEM INCLUDING DUAL RECEIVE ARRAY

(71) Applicant: Apple Inc., Cupertino, CA (US)

(72) Inventors: Jian Wang, Cupertino, CA (US); Gregory E. Rogers, San Jose, CA (US)

(73) Assignee: Apple Inc., Cupertino, CA (US)

( * ) Notice: Subject to any disclaimer, the term of this patent is extended or adjusted under 35 U.S.C. 154(b) by 409 days.

(21) Appl. No.: 15/339,513

(22) Filed: Oct. 31, 2016

Related U.S. Application Data

(60) Provisional application No. 62/387,113, filed on Dec. 23, 2015.

(51) Int. Cl.
| | | |
|---|---|---|
| H01Q 21/08 | (2006.01) | |
| G01S 13/02 | (2006.01) | |
| H01Q 21/00 | (2006.01) | |
| H01Q 9/04 | (2006.01) | |
| G01S 13/06 | (2006.01) | |

(Continued)

(52) U.S. Cl.
CPC ......... *H01Q 21/0006* (2013.01); *G01S 7/352* (2013.01); *G01S 13/06* (2013.01); *G01S 13/58* (2013.01); *H01Q 9/0407* (2013.01); *H01Q 21/08* (2013.01); *G01S 2013/0254* (2013.01)

(58) Field of Classification Search
CPC .. H01Q 21/0006; H01Q 21/08; H01Q 9/0407; G01S 7/352; G01S 7/285; G01S 13/06; G01S 13/58; G01S 2013/0245–0263
See application file for complete search history.

(56) References Cited

U.S. PATENT DOCUMENTS 4,336,540 A * 6/1982 Goodwin ............... G01S 13/422
342/157
2012/0105268 A1 5/2012 Smits et al.
(Continued)

FOREIGN PATENT DOCUMENTS

| DE | 102011113015 | 3/2013 |
|---|---|---|
| DE | 102014118031 | 6/2016 |
| WO | WO 2017/218876 | 12/2017 |

OTHER PUBLICATIONS

Parker, Michael, "Radar Basics—Part 3: Beamforming and radar digital processing," EE Times, Jun. 10, 2011, http://www.eetimes.com/document.asp?doc_id=1278838, accessed Jun. 6, 2016, 9 pages.

*Primary Examiner* — Matthew M Barker
(74) *Attorney, Agent, or Firm* — Polsinelli PC

(57) ABSTRACT

Aspects of the present disclosure involve a radar system employing dual receive antenna arrays. The radar system may include a transmit antenna array to emit a radar beam toward a selected portion of a field of view, as well as a vertical receive antenna array and a horizontal receive antenna array. Each of the receive antenna arrays may include a plurality of antenna elements grouped into sub-arrays that may be configured to receive scatter signals from the selected portion, such as by way of beamforming. The received scatter signals may be combined within each sub-array to generate combined scatter signals, which may then be digitized. A signal data processor may then digitally process the digitized signals from the first sub-arrays and from the second sub-arrays, and correlate the digitally processed signals to generate detection information for each of a plurality of sub-portions of the selected portion.

20 Claims, 13 Drawing Sheets

(51) Int. Cl.
*G01S 13/58* (2006.01)
*G01S 7/35* (2006.01)

(56) References Cited

U.S. PATENT DOCUMENTS

| | | |
|---|---|---|
| 2015/0253420 A1 | 9/2015 | Alland |
| 2016/0025839 A1 | 1/2016 | Trummer |
| 2016/0146931 A1 | 5/2016 | Rao et al. |

\* cited by examiner

RADAR SYSTEM INCLUDING DUAL RECEIVE ARRAY

CROSS-REFERENCE TO RELATED APPLICATION

This application is related to and claims priority under 35 U.S.C. § 119(e) from U.S. Patent Application No. 62/387,113, filed Dec. 23, 2015 entitled "RADAR SYSTEM INCLUDING DUAL RECEIVE ARRAY," the entire contents of which is incorporated herein by reference for all purposes.

TECHNICAL FIELD

This disclosure relates generally to radar systems, and more specifically to radar systems including dual receive arrays.

BACKGROUND

Radar systems have evolved over several decades beyond the military, aeronautical, meteorological, and similar applications with which these systems are often identified. As a result, many more recent radar systems intended for newer applications or environments typically provide low-to-moderate performance compared to some older radar installations to accommodate limiting of the overall radar system size, weight, power, and cost (sometimes referred to as SWaP-C) for such newer applications.

SUMMARY

In one example, a radar system may comprise a transmit antenna array to emit a radar beam toward a selected portion of a field of view. The system may further include a vertical receive antenna array including a plurality of first antenna elements grouped into first sub-arrays. Each of the first sub-arrays receives scatter signals caused by the radar beam from the selected portion of the field of view. A first circuitry, which may be provided by a microcontroller, ASIC, processor, dedicated circuitry and the like, combines the received scatter signals from each of the first sub-arrays into a first combined scatter signal for each of the first sub-arrays. The first circuitry also may digitize the first combined scatter signals into first digitized scatter signals. The system further includes a horizontal receive antenna array, which may be orthogonally positioned relative to the vertical receive antenna array, that comprises a plurality of second antenna elements grouped into second sub-arrays where each of the second sub-arrays receive the scatter signals. The system further includes second circuitry, which may be of similar microcontroller, etc., forms as the first circuitry, combines the received scatter signals from each of the second sub-arrays into a second combined scatter signal for each of the second sub-arrays. Depending on the implementation, the first and second circuitry may be realized in a single processor, microcontroller or the like, or may otherwise utilize common components. The second circuitry also may digitize the second combined scatter signals into second digitized scatter signals. The system further includes a signal data processor to digitally process the first digitized scatter signals to generate vertical detection information corresponding to the vertical receive antenna array, to digitally process the second digitized scatter signals to generate horizontal detection information corresponding to the horizontal receive antenna array, and to correlate the vertical detection information and the horizontal detection information to generate detection information for each of a plurality of sub-portions of the selected portion of the field of view.

In another example, a method of operating a radar system involves emitting a radar beam toward a selected portion of a field of view and receiving scatter signals caused by the radar beam from the selected portion of the field of view at a vertical receive antenna array comprising a plurality of first antenna elements grouped into first sub-arrays. The method further includes combining the received scatter signals from each of the first sub-arrays into a first combined scatter signal for each of the first sub-arrays. The first combined scatter signals may then be digitized into first digitized scatter signals. The method further includes receiving the scatter signals from the selected portion of the field of view at a horizontal receive antenna array comprising a plurality of second antenna elements grouped into second sub-arrays. The method also includes combining the received scatter signals from each of the second sub-arrays into a second combined scatter signal for each of the second sub-arrays and digitizing the second combined scatter signals into second digitized scatter signals. The method may further involve digitally processing the first digitized scatter signals to generate vertical detection information and the second digitized scatter signals to generate horizontal detection information. Finally, the method may include correlating the vertical detection information and the horizontal detection information to generate detection information for each of a plurality of sub-portions of the selected portion of the field of view.

In another example, a radar system may comprise a transmit phased antenna array to emit a radar beam, and a first beamforming circuit to steer the radar beam toward a selected portion of a field of view. The system may further include a vertical receive antenna array comprising a plurality of first antenna elements grouped into first sub-arrays and a second beamforming circuit to cause each of the first sub-arrays to receive scatter signals caused by the radar beam from the selected portion of the field of view. The system may further include a first analog combiner circuit to combine the received scatter signals from each of the first sub-arrays into a first combined scatter signal for each of the first sub-arrays and a first digitizer circuit to digitize the first combined scatter signals into first digitized scatter signals. The system may further include a horizontal receive antenna array comprising a plurality of second antenna elements grouped into second sub-arrays where the horizontal receive antenna array is positioned orthogonally to the vertical receive antenna array. The system may also include a third beamforming circuit to cause each of the second sub-arrays to receive the scatter signals and a second analog combiner circuit to combine the received scatter signals from each of the second sub-arrays into a second combined scatter signal for each of the second sub-arrays, and a second digitizer circuit to digitize the second combined scatter signals into second digitized scatter signals. The system also may include a signal data processor to digitally process the first digitized scatter signals to generate vertical detection information corresponding to the vertical receive antenna array, to digitally process the second digitized scatter signals to generate horizontal detection information corresponding to the horizontal receive antenna array, and to correlate the vertical detection information and the horizontal detection information to generate detection information for each of a plurality of sub-portions of the selected portion of the field of view.

The detection information may include, one or more of, a range to an object in the field of view, an angle including azimuth and elevation to the object in the field of view, a velocity of the object in the field of view, and micro-Doppler information of the object in the field of view.

DETAILED DESCRIPTION

Aspects of the present disclosure involve radar systems including dual receive arrays and methods for operating such radar systems. In at least some embodiments, an example radar system includes a horizontal receive array for generating azimuth information, and a separate vertical receive array for generating elevation information. In examples discussed in more detail below, greater radar range, field of view, resolution, and accuracy may result while limiting overall system size and cost.

In the embodiments described below, the terms "vertical" and "horizontal" are employed to refer to receive antenna arrays oriented substantially orthogonally to each other. Accordingly, the terms "vertical" and "horizontal," in some contexts, may not be interpreted relative to the direction of gravitational forces, but may instead utilize a different frame of reference for those directions.

Figure 1:
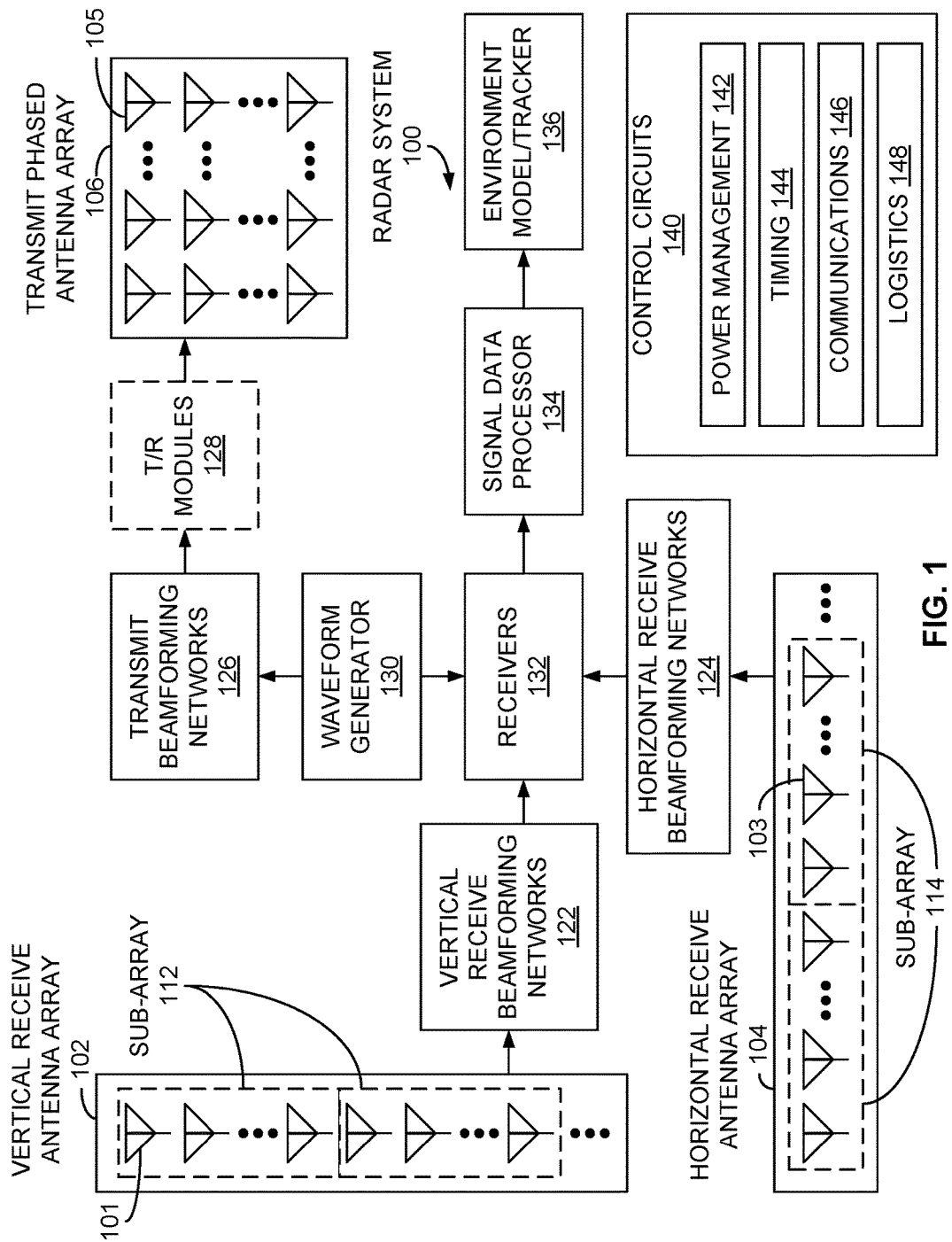
FIG. 1 is a block diagram of an example radar system employing dual receive arrays to provide azimuth and elevation information.

FIG. 1 is a block diagram of an example radar system 100 that includes a vertical receive antenna array 102 that facilitates the generation of elevation information, and a horizontal receive antenna array 104 that facilitates the generation of azimuth information. In at least some examples, the vertical receive antenna array 102 and the horizontal receive antenna array 104 include antenna elements 101, 103 arranged linearly, although other configurations that are not strictly linear are possible in other embodiments. Further, the combination of the receive antenna array 102 and the horizontal receive array 104 may also provide both range and velocity information. Thus, when operated as described in greater detail below, the radar system 100 may generate four-dimensional (4D) information to facilitate high resolution, high accuracy detection and tracking of potential objects or targets.

The radar system 100 may include a transmit phased antenna array 106 to generate the radar transmit signals to be received by the vertical receive antenna array 102 and the horizontal receive antenna array 104. The transmit phased antenna array 106 may be operated in an active electronically scanned array (AESA) mode (or, alternatively, in APAR (active phased array radar) mode) typical of high-end radar systems. When operating in such a mode, the transmit phased antenna array 106 may "steer" (both in azimuth and elevation) the transmission beam over the field of view of the radar system 100 and over time by way of constructive and destructive interference between the individual beams emitted by the individual antenna elements 105 of the transmit phased antenna array 106. Such steering and narrowing of the beam may contribute to the overall range and accuracy of the radar system 100. Other examples of the transmit antenna array 106 may not be strictly a phased antenna array while still providing the functionality described herein. In one example, each of the antenna elements 105 may be a rectangular microstrip, or "patch," antenna arranged in a two-dimensional plane. However, other types of antenna elements 105, as well as other configurations for the antenna elements 105 within the transmit phased antenna array 106, may be employed in other embodiments.

To generate the radio frequency (RF) signals to be transmitted by each of the antenna elements 105, the radar system 100 may include a waveform generation generator 130 controlled by one or more control circuits 140, such as one or more digital signal processors (DSPs), microprocessors, and/or other electronic circuits, that may generate a baseband signal that is subsequently processed (e.g., amplified, phase-shifted, up-converted in frequency, and/or so on) at multiple transmit beamforming networks 126 to produce the signals to be transmitted by the individual array elements 105. An example of the transmit beamforming networks 126 is discussed more fully below in conjunction with FIG. 2. In some examples, individual transmit/receive (T/R) modules 128 often employed in other AESA radar systems may be utilized to further condition the signals from the transmit beamforming networks 126, such as to enable or disable the beams, perform additional signal conditioning (e.g., amplification and/or filtering), and the like.

Scatter signals from objects or targets within the field of the radar system 100 resulting from the steered beam transmitted by the transmit phased antenna array 106 may then be received at the vertical receive antenna array 102 and the horizontal receive antenna array 104. As with the transmit phased antenna array 106, individual antenna elements 101 of the vertical receive antenna array 102 and individual antenna elements 103 of the horizontal receive antenna array 104 may be patch antennas, although other types of antenna types may be utilized in other examples. The antenna elements 101 and 103 of the vertical receive antenna array 102 and the horizontal receive antenna array 104 may be arranged as a one-dimensional linear array in at least some embodiments.

Continuing with FIG. 1, the antenna elements 101 and 103 of the vertical receive antenna array 102 and the horizontal receive antenna array 104 may receive their individual operating signals from corresponding vertical receive beamforming networks 122 and horizontal receive beamforming networks 124. In an example, each of the vertical receive beamforming networks 122 and the horizontal receive beamforming networks 124 may be controlled by the control circuits 140 mentioned above to effectively steer the direction from which the scatter signals may be detected.

In the particular example of FIG. 1, the antenna elements 101 of the vertical receive antenna array 102 may be grouped into sub-arrays 112, while the antenna elements 103 of the horizontal receive antenna array 104 may be grouped into sub-arrays 114, with the signals being received by each antenna element 101 and 103 of each sub-array 112 and 114 being combined and/or otherwise processed (e.g., amplified, phase-shifted, and/or the like) in an analog fashion within the vertical receive beamforming networks 122 and the horizontal receive beamforming networks 124, respectively. As is described in greater detail hereinafter, such combining within each sub-array 112 and 114 may serve to increase the accuracy and resolution of object detection of the radar system 100.

A receiver circuit 132 may then receive each of the processed signals generated by the vertical receive beamforming networks 122 and the horizontal receive beamforming networks 124, down-convert the signals to baseband using one or more signals from the waveform generator 130, and further process (e.g., amplify, filter, digitize, and/or so on) the signals to provide multiple channels of digital data representing the scatter signals received at the vertical receive antenna array 102 and the horizontal receive antenna array 104, with each channel being associated with a particular sub-array 112 and 114. In some embodiments, each instance of digital data on each channel may represent a sample or "snapshot" of the combined signal received from each sub-array 112 and 114. In an example, the waveform generator 130 provides to the receivers 132 a copy of the same signal sent to the transmit beamforming networks 126, thus coordinating the timing of the receivers 132 with the transmit beamforming networks 126. However, in other examples, the signal sent to the receivers 132 may be different, but still may include such timing information. An example of the vertical receive beamforming networks 122, the horizontal receive beamforming networks 124, and the receivers 132 is described more fully below in connection with FIG. 3.

The waveform generator 130, in some examples, may provide a sinusoidal waveform, a pseudo-random waveform, a frequency-modulated continuous waveform, or some other type of waveform that provides useful signals for the generation and reception of radar signals via the components of the radar system 100 described above. In one example, the waveform generator 130 may include a baseband waveform generator coupled with a phase-locked loop (PLL)-based RF signal generator so that the waveform generator 130 may provide the generated RF signal and/or baseband signal to the transmit beamforming network 126 and the receivers 132. In some examples, timing signals to operate the waveform generating 130, such as to facilitate the generation of the baseband signal, may be provided by the control circuits 140, which are described more completely below.

Further in FIG. 1, a signal data processor 134 may receive the digital data signals generated by the receivers 132 and digitally process the digital data to determine a range, angle (e.g., azimuth and/or elevation), velocity, and/or micro-Doppler information of each potential object detected within the field of view of the radar system 100. Such processing may include, for example, a Fast Fourier Transform (FFT) calculated across all of the channels associated with each of the vertical receive antenna array 102 and the horizontal receive antenna array 104. Such processing may also include, for example, a time-frequency analysis to extract micro-Doppler information of objects to better classify those objects. In one example, the signal data processor 134 may include a digital signal processor (DSP), microprocessor, and/or other digital circuitry.

The signal data processor 134 may then provide the generated object information to an environment model/tracker 136, which may track each potential object from scan to scan performed within the field of view of the radar system 100 to provide an updated indication of the current location, direction, speed, shape, and/or micro-Doppler of one or more objects within the environment of the radar system 100. As with the signal data processor, the environment model\tracker 136 may include a DSP, microprocessor, and/or other digital circuitry.

As depicted in FIG. 1, the control circuits 140 may include, in one example, a power management control circuit 142, a timing control circuit 144, a communications control circuit 146, and a logistics control circuit 148. However, other embodiments of the control circuits 140 may include greater or fewer numbers of control circuits than those illustrated in FIG. 1, possibly including control circuits not specifically discussed herein. Moreover, the control circuits 140 may be implemented using dedicated digital and/or analog electronic circuitry. In some examples, the control circuit 140 may include one or more microcontrollers, microprocessors, and/or digital signal processors (DSPs) configured to execute instructions stored in a memory device or system to perform the various operations described herein.

While the control circuits 140 are depicted in FIG. 1 as employing separate circuits 142, 144, 146, and 148, such circuits may be combined at least partially. Moreover, the control circuits 140 may be combined with other control circuits described hereafter. Additionally, the control circuits disclosed herein may be apportioned or segmented in other ways not specifically depicted herein while retaining their functionality, and communication may occur between the various control circuits in order to perform the functions discussed herein.

In an example, the power management control circuit 142 may control the availability, level, and/or other characteristics of the power provided to the remainder of the radar system 100. The timing control circuit 144 may provide timing and other control signals utilized by the waveform generator 130, receivers 132, vertical receive beamforming networks 122, horizontal beamforming networks 124, transmit beamforming networks 126, and/or T/R modules 128. The communications control circuit 146 may facilitate communication between the signal data processor 134, environment model/tracker 136, and/or other portions of the radar system 100 with one or more other controllers or systems, such as by way of a communication interface or network. Such other systems may include additional object detection systems, as well as other systems that may coordinate with the radar system 100 to perform one or more functions or tasks. Additionally, such systems may further include a central fusion unit that may combine information from multiple sensors. The logistics control circuit 148 may perform one or more logistical functions, such as built-in self-test functionality, error logging, and the like.

Figure 2:
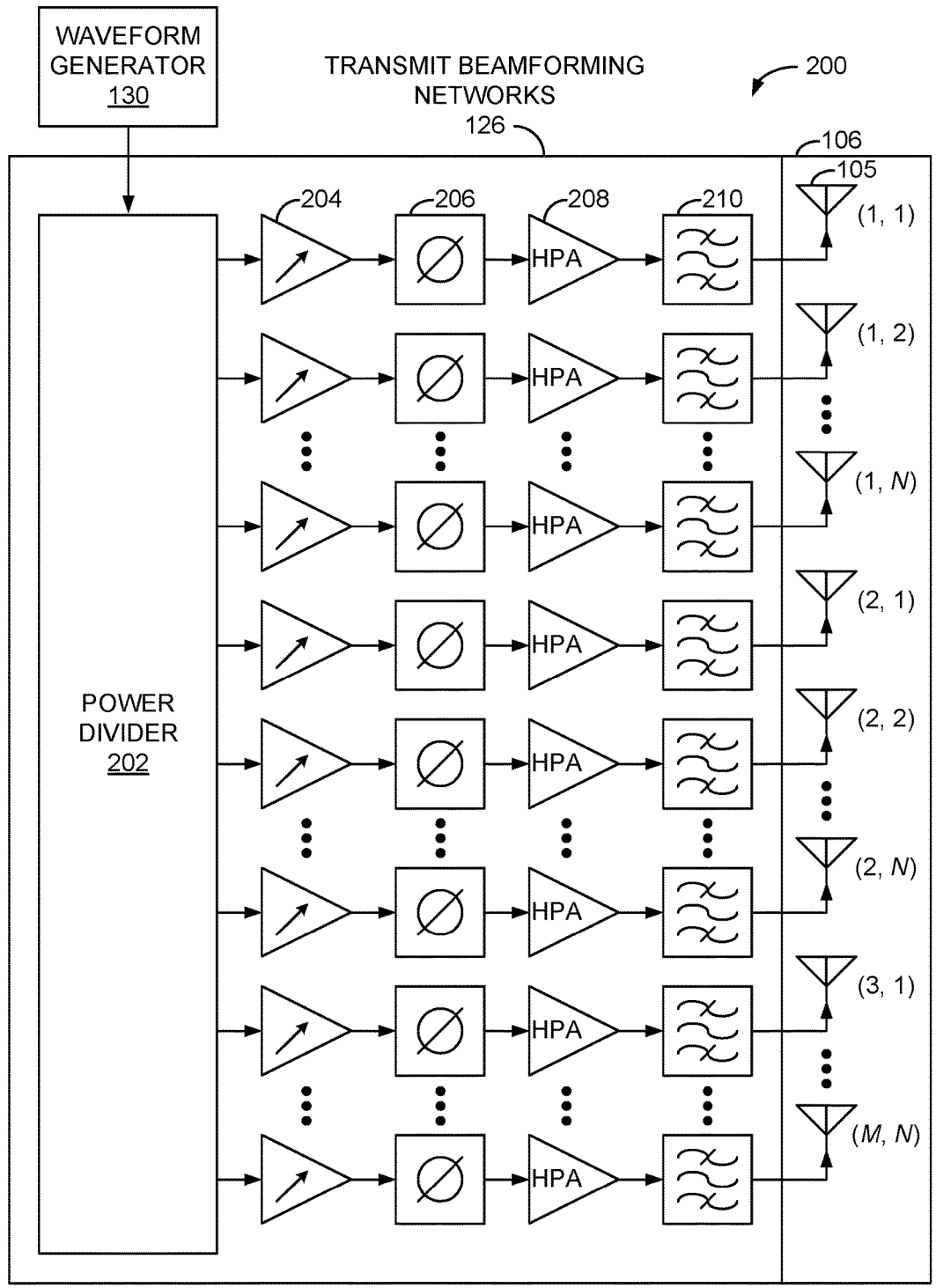
FIG. 2 is a block diagram of an example transmit array circuit for the example radar system of FIG. 1.

FIG. 2 is a block diagram of an example transmit array circuit 200 for the radar system 100 of FIG. 1. In this example, the circuit 200 includes examples of the transmit beamforming networks 126 and the transmit phased antenna array 106, shown in conjunction with the waveform generator 130 of FIG. 1. As shown in FIG. 1, the transmit phased antenna array 106 may be an M×N array, with each of the antenna elements 105 being positioned at a corresponding position within the array, such as row 1, column 1 (1,1), row 1, column 2 (1, 2), and so on, up to column M, row N (M, N).

In this example, an RF signal from the waveform generator 130 is provided as input to a power divider 202 of the transmit beamforming networks 126 to divide the power of the RF signal equally, or substantially equally, to provide the RF signal to each of a plurality of separate beamforming networks 126 associated with a respective one of the antenna elements 105 of the transmit phase antenna array 106. In the particular example of FIG. 2, each network 126 may include a variable gain amplifier (VGA) 204 that may be used to reduce or amplify the amplitude of the incoming signal from the power divider 202. The output of the VGA 204 may then be provided to a variable phase shifter 206. Each of the phase shifters 206 may be set to shift the phase of its incoming RF signal by a particular amount such that the resulting RF beam emitted from the transmit phase antenna array 106 may be steered toward a particular area within the field of view of the radar system 100. The phase shifter 206 may be implemented using a plurality of selectable line lengths, various filtration methods, and/or the like to provide a selectable phase delay for the RF signal. In other examples, the phase shifter 206 may be replaced with a delay element. The output of the phase shifter 206 may then be forwarded to a high-power amplifier (HPA) 208 to amplify that signal. The amplified RF signal may then be provided as input to a spectrum-limiting filter 210 to spectrally shape the outgoing RF signal before being forwarded to its corresponding antenna element 105 of the transmit phase antenna array 106.

While FIG. 2 provides a particular configuration for the transmit beamforming networks 126, other types, numbers, and orders of components for each of the networks 126 may be employed in other examples.

Since the transmit phased antenna array 106 and corresponding circuitry are not also employed for the receiving of the scatter signals, the transmit beamforming networks 126 may not be deactivated during any particular time to allow reception of the resulting scatter signals, unlike many other AESA-based radar systems. Without such deactivation, overall operation of the radar system 100 may be accelerated as a result.

Figure 3:
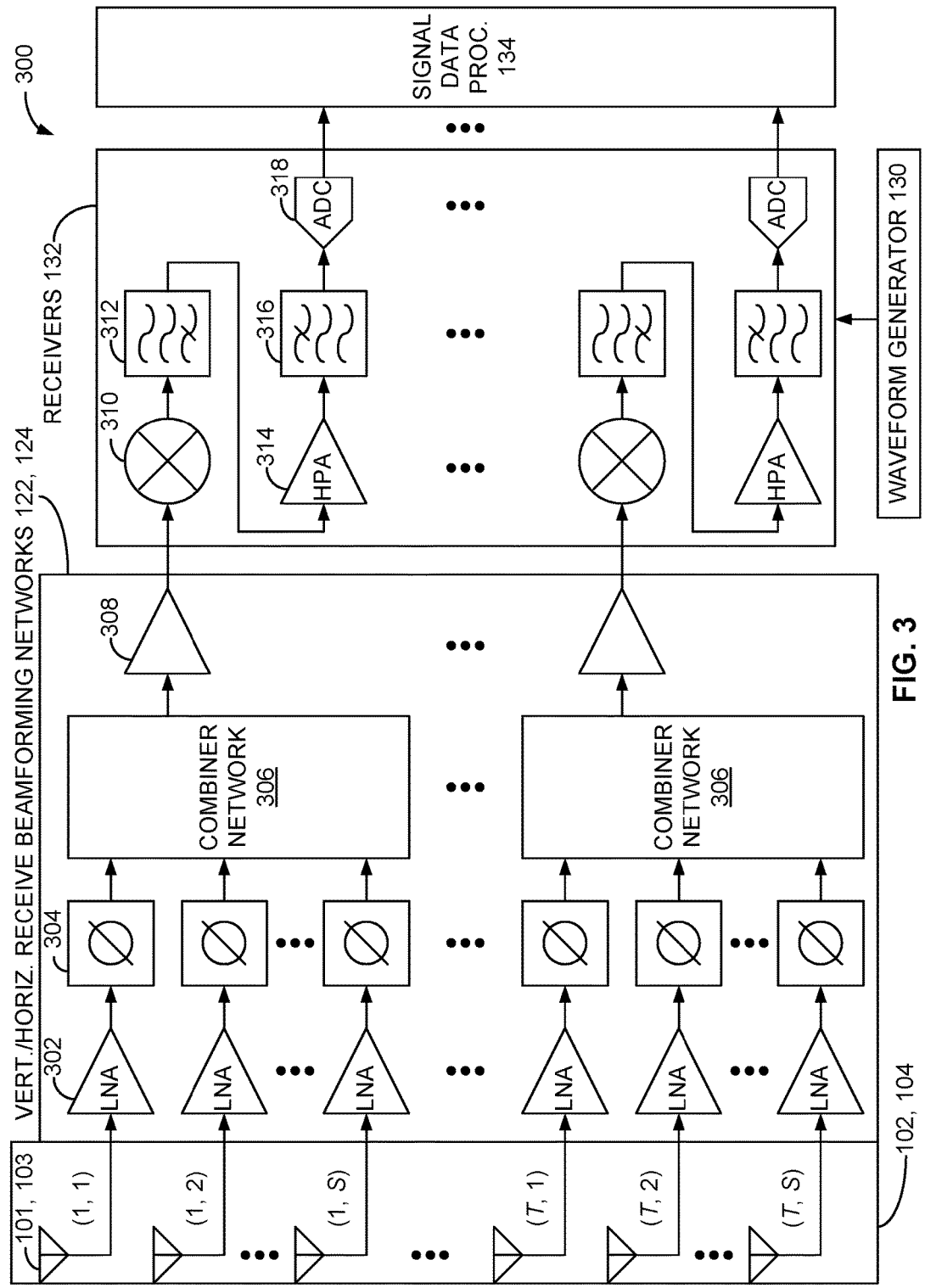
FIG. 3 is a block diagram of an example receive array circuit for the example radar system of FIG. 1.

FIG. 3 is a block diagram of an example receive array circuit 300 for the radar system 100 of FIG. 1. The receive array circuit 300 may be employed in conjunction with either or both of the vertical receive antenna array 102 and the horizontal receive antenna array 104. FIG. 3 depicts an example in which the receive array circuit 300 includes an example of the vertical and/or horizontal receive antenna arrays 102 and 104, the vertical and/or horizontal beam-forming networks 122 and 124, and the receivers 132, shown operating in conjunction with the waveform generator 130 and the signal data processor 134. In each of the receive antenna arrays 102 and 104, the various antenna elements 101 and 103 may be grouped into sub-arrays 112 and 114, as mentioned above. For example, within the vertical receive antenna array 102, the antenna elements 101 may be grouped into T sub-arrays 112, with each sub-array 112 including S antenna elements 101. The antenna elements 103 may be similarly grouped within the horizontal receive antenna array 104. In some examples, the total number of antenna elements 101, 103, as well as the number of sub-arrays 112, 114 and the number of antenna elements 101, 103 within each sub-array 112, 114, may be different between the vertical receive antenna array 102 and the horizontal receive antenna array 104.

Similar to FIG. 2, while FIG. 3 provides a specific configuration for the vertical and/or horizontal beamforming networks 122 and 124, as well as the receivers 132, other types, numbers, and orders of components for each of the networks 122 and 123 and the receivers 132 are possible in other embodiments.

In the example of FIG. 3, the RF scatter signal received by each antenna array element 101 and 103 may be provided as input to a low noise amplifier (LNA) 302 to accurately amplify the signal. The amplified signal may then be forwarded to a variable phase shifter 304 (or delay element) such that the signal received at each of antenna elements 101, 103 within each sub-array 112, 114 may be phase-shifted to correspond to a particular elevation (for the vertical receive antenna array 102) or azimuth (for the horizontal receive antenna array 104). More specifically, each of the sub-arrays 112, 114 may be directed to the same elevation or azimuth to facilitate the probing of multiple areas with the field of view of the radar system 100 simultaneously or concurrently with high resolution.

The output from each of the phase shifters 304 of a particular sub-array 112, 114 may then be combined or summed in an analog manner using a combiner network 306. The summed signal from each of the combiner networks 306 may then be provided to an amplifier 308 prior to forwarding to the receivers 132.

At the receivers 132, a mixer 310 may down-convert the combined, amplified RF signal received from its corresponding sub-array 112, 114 to a baseband signal by mixing or multiplying the received RF signal with a local oscillator signal provided by the waveform generator 130. Once the received RF signal is down-converted, the resulting baseband signal may be filtered by way of a high-pass filter 312, amplified using an amplifier 314, and filtered via a low-pass filter 316 prior to being digitized by way of an analog-to-digital converter (ADC) 318. The digitized signal for each channel associated with a particular sub-array 112, 114 may then be provided by the vertical or horizontal beamforming network 122 and 124 that includes that ADC 318 to the signal data processor 134, which may use an FFT algorithm and/or other processing across all of the digitized signal to generate the information descriptive of the range, azimuth, elevation, velocity, and/or micro-Doppler information of one or more objects within the field of view of the radar system 100, as mentioned above.

In examples of the vertical receive antenna array 102 and the horizontal receive antenna array 104 discussed above, including the individual array elements 101 and 103, associated sub-arrays 112 and 114, as well as the associated circuitry discussed above, the receive antenna arrays 102 and 104 may be operated in a hybrid analog/digital mode to generate the 4D information mentioned above. More specifically, individual array elements 101, 103 of each sub-array 112, 114 may be combined in analog fashion to create a digital channel for that sub-array 112, 114. Further, the digital channels for the entire vertical receive antenna array 102 or the entire horizontal receive antenna array 104 may be combined digitally at the signal data processor 134, such as by way of an FFT calculation, to derive 4D information of enhanced resolution and accuracy.

To aid in describing how such enhanced information may be generated, FIGS. 4A through 4D provide graphical depictions relating individual antenna elements and associated sub-arrays of example receive antenna arrays of the radar system 100 of FIG. 1. In the following discussion, the operation of the horizontal receive antenna array 104 and associated components are discussed, but this discussion is equally applicable to the vertical receive antenna array 102 and corresponding circuitry.

Figure 4A:
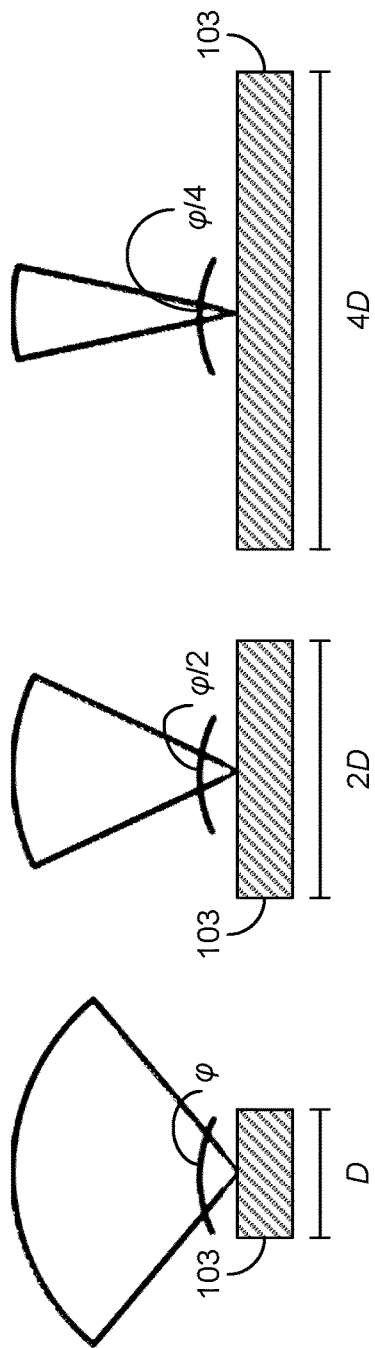
FIGS. 4A through 4D are graphical depictions relating individual antenna elements and associated sub-arrays of example receive antenna arrays of the example radar system of FIG.

FIG. 4A is a graphical depiction of various examples of a single antenna element 103 that illustrates how the beam width (or angle) φ of that antenna element 103 is inversely proportional to the effective antenna aperture D of the antenna element 103. Typically, the effective aperture D of an antenna is related to the surface area of the antenna normal to the direction of the beam. Presuming the effective aperture D results in a beam width φ, then doubling the effective aperture of the antenna element 103 to 2D results in a corresponding narrower beam width of φ/2. Correspondingly, doubling the effective aperture of the antenna element 103 again to 4D results in an even narrower beam width of φ/4.

Figure 4B:
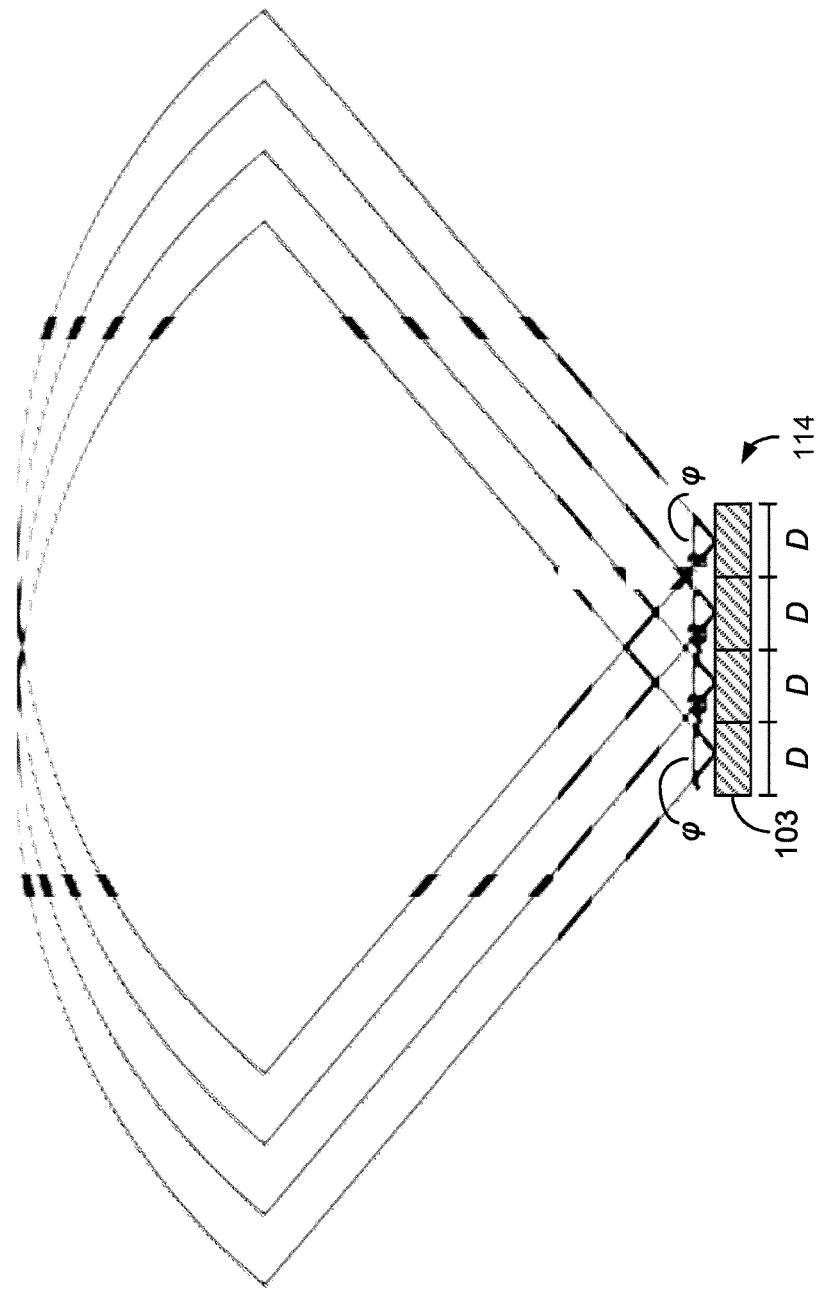
Figure 4D:
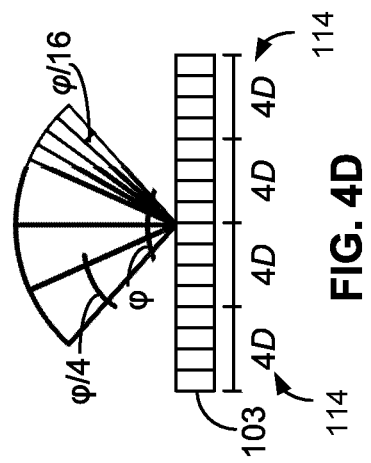
Figure 4C:
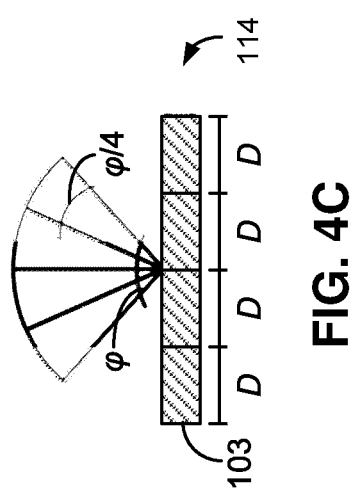

As shown in FIGS. 4B and 4C, a corresponding effect may be achieved by arranging and electrically combining a plurality of separate antenna elements 103, each having an effective aperture of D, as a sub-array 114, as described above. In the example of FIG. 4B, four antenna elements 103 are arranged adjacent to each other as a sub-array 114, resulting in their beams, each having a beam width of φ, substantially overlapping. By combining the signals of the antenna elements 103 in the analog domain, as discussed above with respect to FIG. 3, an effective beam width of φ/4 is achieved for the sub-array 114, as depicted in FIG. 4C. Each of these narrowed beam widths corresponds to a single sub-array 114 digital channel, as described earlier.

Moreover, by supplying multiple sub-arrays 114, each directed to the same portion of the field of view, and processing the resulting digital channels of the sub-arrays 114 together, such as by way of an FFT, may result in the generation of multiple beams, each with an effective beam width narrower than the beam width of φ/4 associated with each individual sub-array 114. In FIG. 4D, for example, four sub-arrays 114, each having four antenna elements 103, are aligned substantially adjacent to each other, resulting in an effective antenna aperture of 16D. By combining the signals from individual antennae 103 within each sub-array 114 in the analog domain, digitizing the signal associated with each sub-array 114 to yield four separate digital channels, and then simultaneously combining the four channels digitally, four simultaneous digital beams may be generated, each with an effective beam width of φ/16. Consequently, to detect an object within the overall beam width of φ, the beams of the sub-arrays 114 would be steered to each φ/4 portion in succession, resulting in four separate scans.

By employing the process described above to both the horizontal receive antenna array 104 and the vertical receive antenna array 102, and digitally combining the information received from the arrays 102 and 104, areal portions of the original beam width of φ may be probed individually, resulting in increased resolution and accuracy, while limiting equipment costs and overall scanning time typically associated with an AESA radar system.

While the example of FIGS. 4A through 4D describes a particular embodiment employing sixteen total antenna elements 103 grouped into four sub-arrays 114, other numbers of antenna elements 103 and sub-groups 114, as well as a measurable spacing between two neighboring antenna elements 103, are also possible. In some examples, the antenna element 103 may have an effective aperture D smaller than the distance between neighboring antenna elements 103. Under such circumstances, the sub-array 114 may have an overall aperture determined by the number of antenna elements 103 in the sub-array 114 and the distance among them. However, the same working principle described in the embodiments of FIGS. 4A through 4D also applies in these examples.

Figure 5:
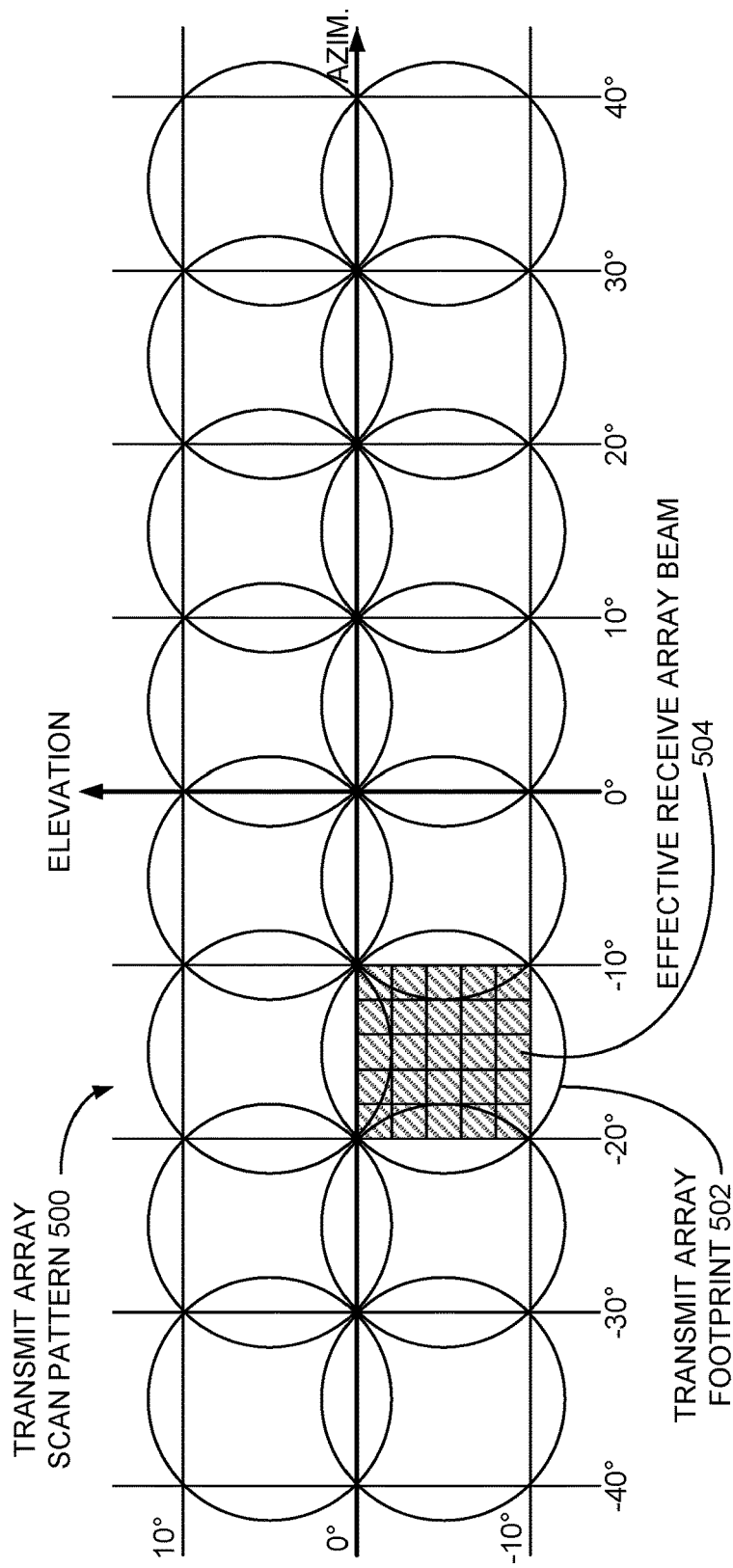
FIG. 5 is a graphical depiction of a scanning pattern of an example transmit phased antenna array of the radar system of FIG. 1.

To facilitate the detection and tracking of objects within the total field of view of the radar system 100, the operation of the transmit phased antenna array 106 and the receive antenna arrays 102 and 104 may be coordinated to scan the field of view one portion at a time. For example, FIG. 5 is a graphical depiction of a scan pattern 500 of an example transmit phased antenna array 106 of the radar system of FIG. 1. In this particular example, the beam provided by the transmit phased antenna array 106 is presumed to possess a footprint 502 of about ten degrees in both elevation and azimuth. Typically, the footprint 502 may be defined as the 3-dB (decibel) beam width of the transmit array 106. Thus, to cover a desired area of −40 to +40 degrees azimuth and −10 to +10 degrees elevation, the transmit phased antenna array 106 would perform a total of sixteen scans in series, such as two rows of eight scans each, by directing the radar beam using phase-shifting or signal-delaying, as discussed earlier.

However, within each scan footprint 502, representing a portion of the overall field of view, high resolution detection in both azimuth and elevation may occur over a plurality of sub-portions of the scan footprint 502 simultaneously by employing the aspects described above. In this example, the vertical receive antenna array 102 possesses an overall beam width of 25 degrees elevation, but an effective beam width of two degrees elevation due to the organizing of the antenna elements 101 into five sub-arrays 112, as well as the analog and digital processing describe above, resulting in five 2-degree beams being processed simultaneously. Presuming the horizontal receive antenna array 104 is operated in a similar manner, a total of 25 sub-portions 504, in a five-by-five pattern, of the scan footprint 502, may be processed simultaneously. Accordingly, the number of sub-portions being processed may be equal to the number of sub-arrays 112 of the vertical receive antenna array 102 multiplied by the number of sub-arrays 114 of the horizontal receive antenna array 104. Each scan footprint 502 may then be processed in serial fashion, resulting in a fast, high resolution scan of the entire field of view.

Figure 6:
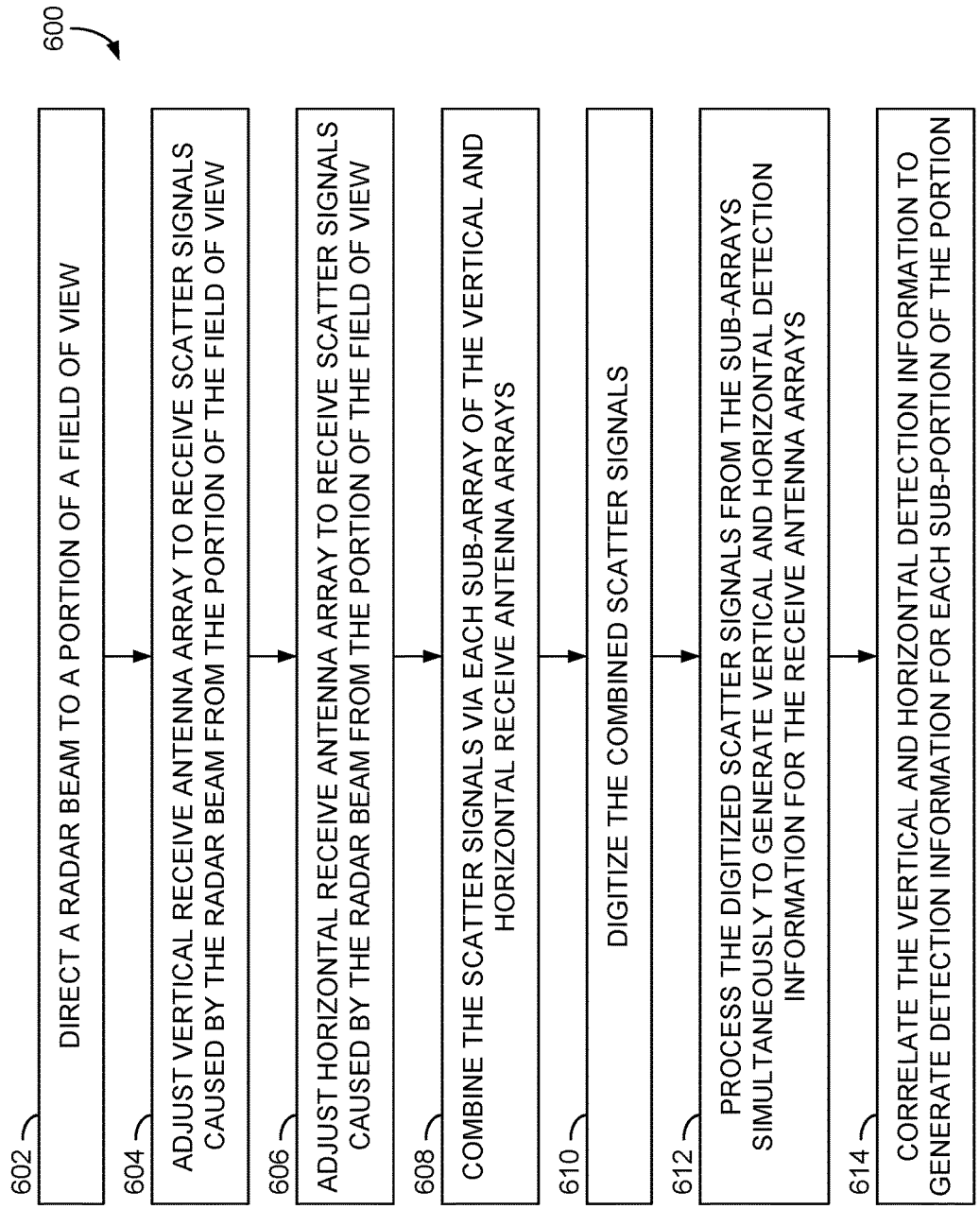
FIG. 6 is a flow diagram of an example method of operating the example radar system of FIG. 1.

FIG. 6 is a flow diagram of an example method 600 of operating the example radar system 100 of FIG. 1. While the method 600 is described below in conjunction with the radar system 100 and its various components, as disclosed above, other embodiments of the method 600 may employ different devices or systems not specifically discussed herein.

In the method 600, a radar beam generated by the transmit phased antenna array 106 is directed to a particular portion of the field of view for a dwell time (operation 602), such as by way of electronic beamsteering, as explained earlier. The vertical receive antenna array 102 is adjusted (e.g., by way of beamforming) in elevation to receive scatter signals from the portion of the field of view caused by the radar beam (operation 604). The horizontal receive antenna array 104 is adjusted in azimuth to receive the scatter signals from the same portion of the field of view (operation 606). During the dwell time, the scatter signals are received at the antenna elements 101 and 103 of each of the sub-arrays 112 and 114 of each of the receive antenna arrays 102 and 104 (operation 608), with the signals of the antenna elements 101 and 103 being combined in the analog domain within each sub-array 112 and 114. The combined signal of each sub-array 112 and 114 is digitized (operation 610), and the digitized signals are digitally processed simultaneously to generate detection information corresponding to each of the receive antenna arrays 102 and 104 (operation 612). The vertical detection information corresponding to the vertical receive antenna array 102 may be correlated to the horizontal detection information corresponding to the horizontal receive antenna array 104 to generate sub-portion detection information for each of a plurality of sub-portions of the portion of the field of view (operation 614). In an example, each sub-portion corresponds to an intersection of one of the effective beam widths produced by the sub-arrays 112 of the vertical receive antenna array 102 and the sub-arrays 114 of the horizontal receive antenna array 104.

While FIG. 6 depicts the operations 602-614 of the method 600 as being performed in a single particular order, the operations 602-614 may be performed repetitively over some period of time, both with respect to each footprint 502 or portion scanned, as well as to multiple repetitive scans of the entire field of view of the radar system 100, to provide ongoing detection and tracking of one or more objects within the field of view.

Figure 7:
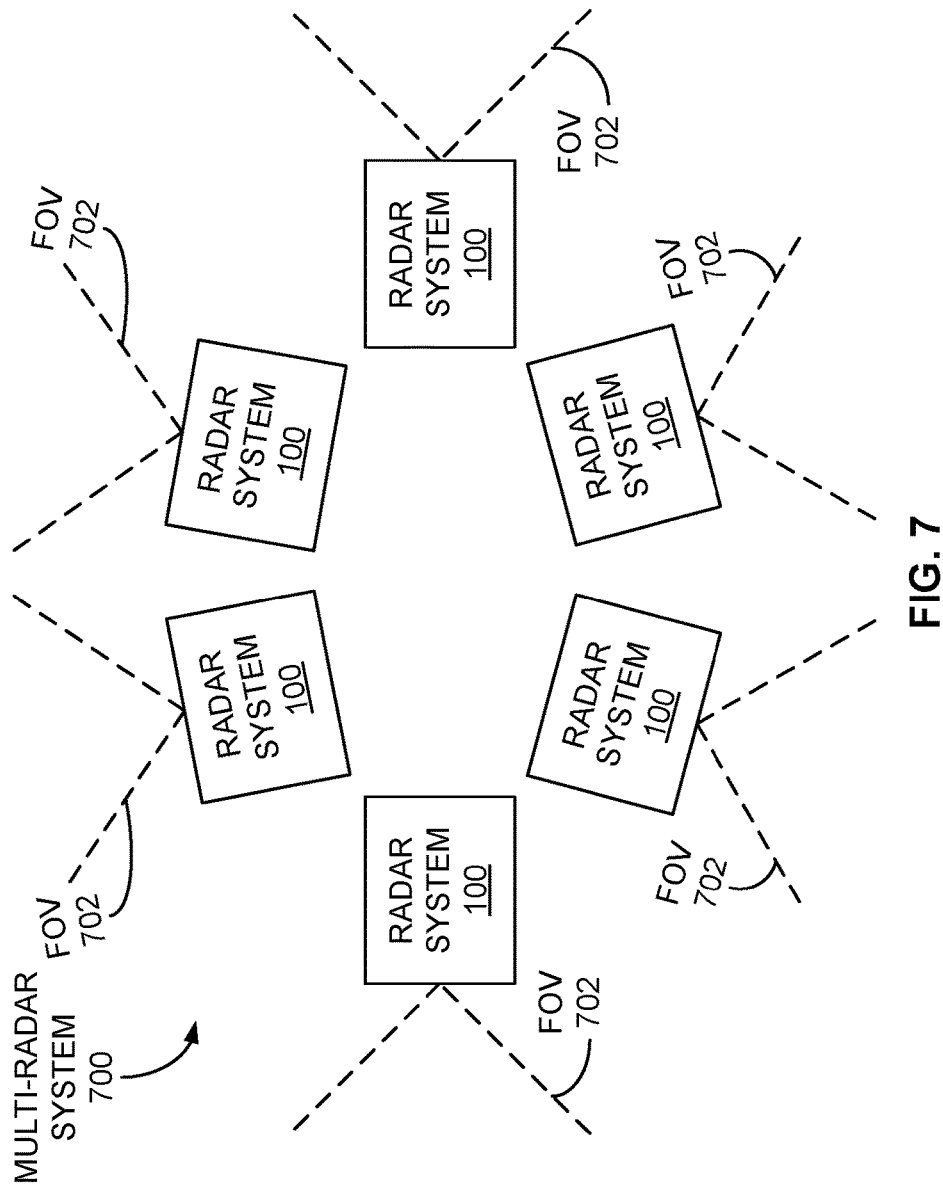
FIG. 7 is a block diagram of an example multiple-radar system employing the example radar system of FIG. 1 to facilitate multiple fields of view.

FIG. 7 is a block diagram of an example multiple-radar system 700 employing the radar system 100 of FIG. 1 to facilitate multiple fields of view 702. In one example, while each individual radar system 100 may possess a field of view of 60-120 degrees azimuth, the use of multiple such radar systems 100 in concert may provide 360-degree azimuth coverage of an environment. While six individual radar systems 100 are employed in the example of FIG. 7, other numbers of radar systems 100 may be utilized, depending on the operational characteristics imposed on the overall system 700. In yet other examples, multiple radar systems 100 may be employed to increase coverage in elevation in addition to, or in lieu of, multiple radar systems 100 used for increased azimuth coverage.

Figure 8:
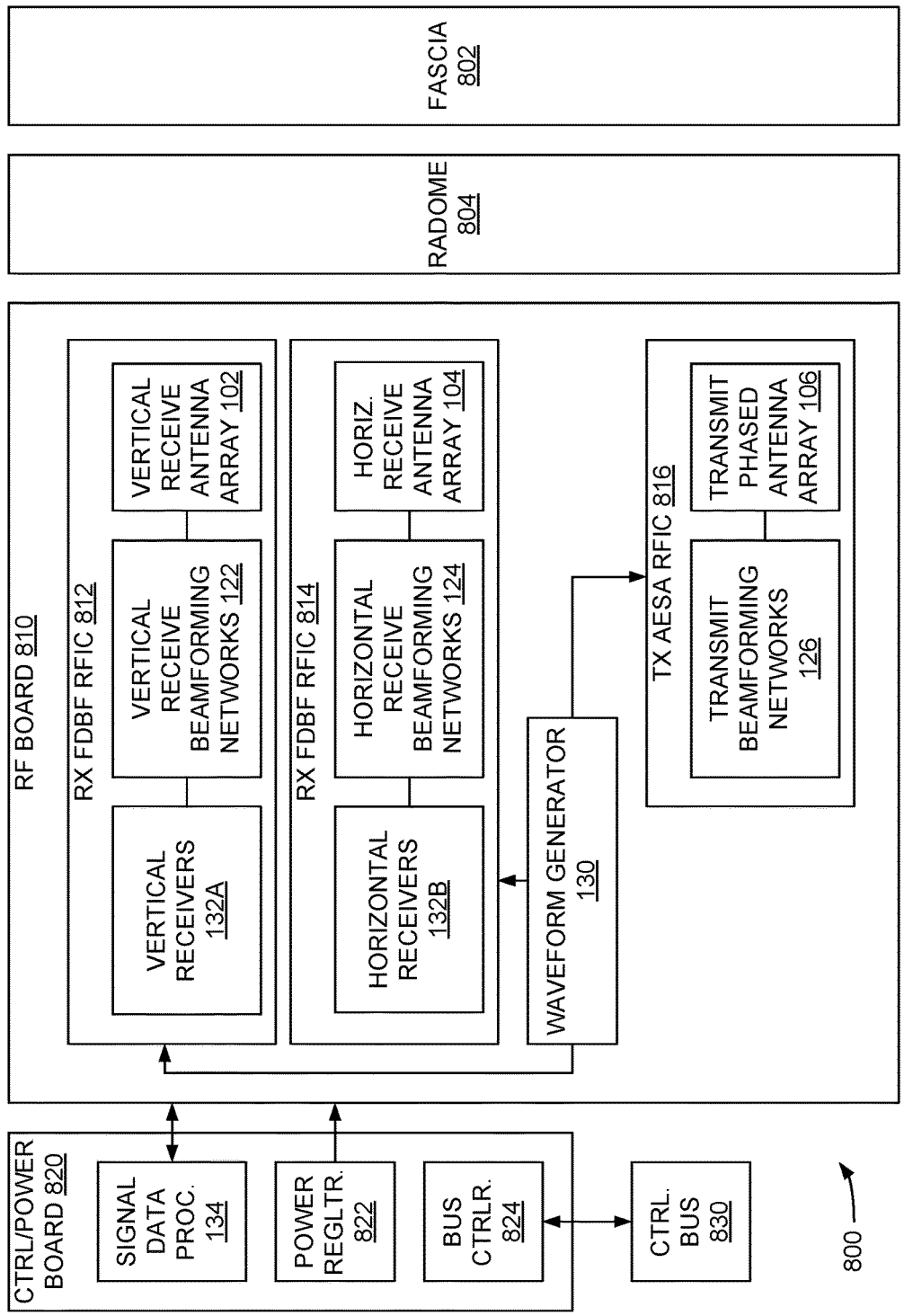
FIG. 8 is a block diagram of an example hardware environment in which the example radar system of FIG. 1 may operate.

FIG. 8 is a block diagram of an example hardware environment 800 in which the example radar system of FIG. 1 may operate. In the example of FIG. 8, the hardware environment 800 is described in reference to a vehicle, such as an autonomous or semiautonomous vehicle to facilitate control of acceleration, braking, steering, navigation, and/or other functions, but other environments may benefit from the use of the environment 800 in other embodiments. Also, while FIG. 8 illustrates a particular component arrangement for the hardware environment 800, many other types of arrangements may be employed in other embodiments.

The hardware environment 800 may include a radome 804 constructed of a non-metallic material to enclose at least a portion of the remainder of the radar hardware environment 800 to protect that portion from rain, snow, ice, dirt, dust, and other environment threats. In addition, the radome 804 may be positioned behind a fascia 802, such as a plastic or fiberglass bumper or fender of a vehicle, to essentially hide the radome 804 to improve the overall aesthetics of the vehicle.

The hardware environment 800 may include one or more RF printed circuit boards 810 that may include several components of the radar system 100 of FIG. 1, such as the vertical receive antenna array 102, the horizontal receive antenna array 104, the transmit phased antenna array 106, the vertical receive beamforming networks 122, the horizontal receive beamforming networks 124, the transmit beamforming networks 126, the waveform generator 130, and the receivers 132. More specifically, as depicted in FIG. 8, the RF board 810 may be populated with a first receive final digital beamforming RF integrated circuit (RX FDBF RFIC) 812 that includes the vertical receive antenna array 102, the vertical receive beamforming networks 122, and receivers 132A corresponding to the vertical receive antenna array 102. Also included on the RF board 810 may be a separate receive final digital beam forming integrated circuit (RX FDBF IC) 814 that includes the horizontal receive antenna array 104, the horizontal receive beamforming networks 124, and receivers 132B corresponding to the horizontal receive antenna array 104. Also included on the RF board 810 may be a transmit AESA RF integrated circuit (TX AESA RFIC) 816 including the transmit phased antenna array 106 and the transmit beamforming networks 126. In other examples, the vertical receive antenna array 102, the horizontal receive antenna array 104, and/or the transmit phased antenna array 106 may be mounted directly to, or incorporated within, the RF board 810. The RF PCB 810 may also have mounted thereon the waveform generator 130 of the radar system 100.

The hardware environment 800 may also include a separate control/power board 820 that may include the signal data processor 134, as well as a power regulator 822 for the RF board 810, and a bus controller 824. In one example, the bus controller 824 may include a controller for a controller bus 830, such as a Controller Area Network (CAN) bus to which other controllers may be communicatively coupled. In one example, the bus controller 824 may facilitate the transmission of detection data to another controller, such as the environment model/tracker 136 of FIG. 1

Figure 9:
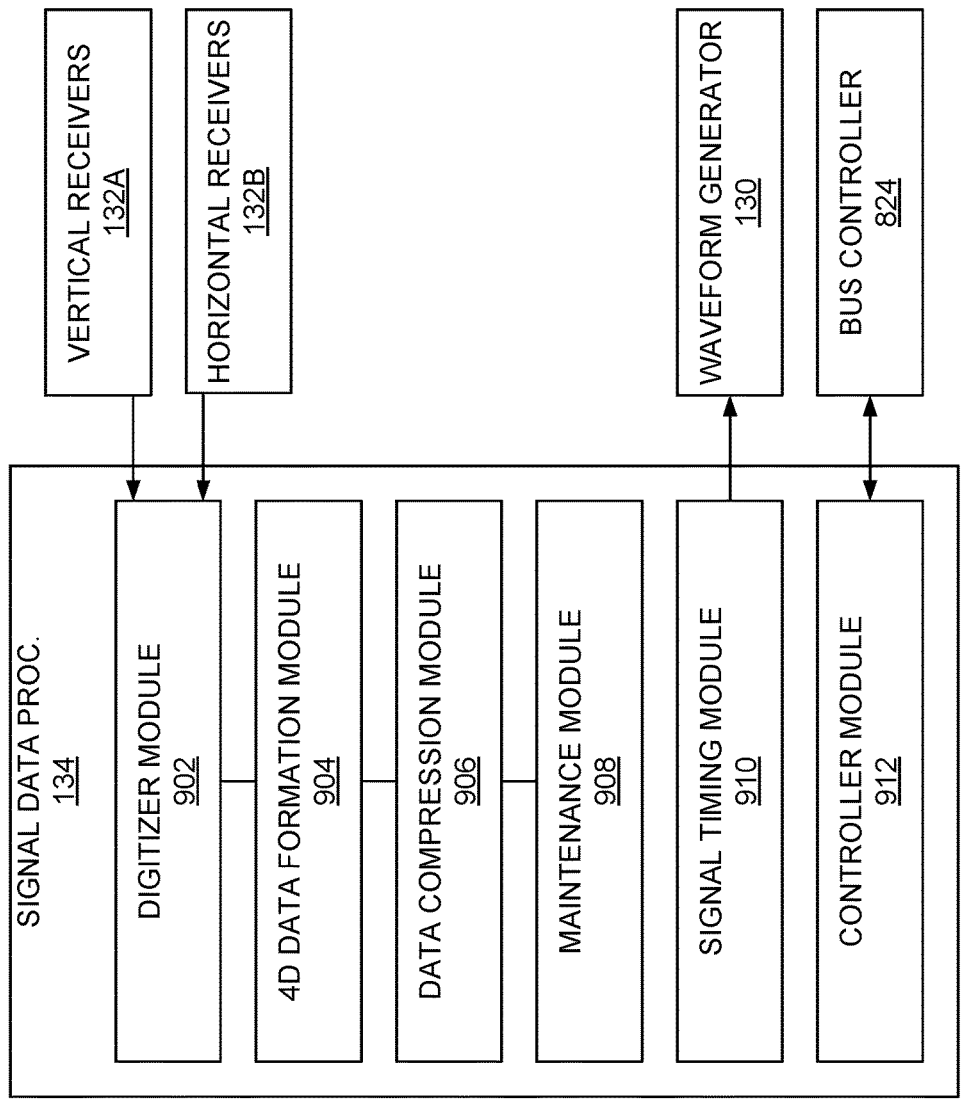
FIG. 9 is a block diagram of an example signal data processor of the example radar system of FIG. 1.

FIG. 9 is a block diagram of the signal data processor 134 of the radar system 100 of FIG. 1. In this example, the signal data processor 134 may include a digitizer module 902, which may include the ADCs 318 of the receivers 132. In other examples, the ADCs 318 may reside with the remainder of the circuitry of the receivers 132 on the RF board 810. The signal data processor 134 may also include a 4D data formation module 904 for generating the range, azimuth, elevation, and/or velocity information for one or more objects as detected via the radar system 100. The 4D data formation module 904 may also provide special processing operations to extract micro-Doppler information for particular objects, such as human beings. This processing may be guided by the environment model/tracker 136 to only apply to particular detected objects (e.g., based on size, velocity, and/or so on) to minimize processing time.

The signal data processor 134 may also include a data compression module 906 to compress the generated 4D and related information to more easily transport and store that data. The data compression module 906 may perform thresholding, detection clustering, and centroiding of the potential targets or objects. The data compression module 906 may also include shape measurements from each formed cluster. Moreover, the data compression module 906 may also include a data correlator to jointly process the signals received through both the vertical receive antenna array 102 and the horizontal receive antenna array 104 and form both azimuth and elevation information for each target, as described above. The joint processing can include, but is not limited to, matching the range and Doppler information of each target received from the horizontal receive antenna array 104 to that received from the vertical receive antenna array 102. In other examples, this joint processing may be performed instead within the environmental model/tracker module 136.

The signal data processor 134 may further include a maintenance module 908 to perform various maintenance or logistical functions related to the radar system 100, such as built-in self-test, calibration, alignment, blockage detection, and so on. The signal data processor 134 may also include a signal timing module 910 to control the waveform generator 130, possibly in addition to other aspects of the radar system 100, to generate timing signals for use in scanning of the field of view of view, transmitting of the radar beam, receiving of the scatter signals, beamforming and/or beam-steering of the transmit and receive circuits, and so on. In addition, the signal data processor 134 may include a controller module 912 for controlling the bus controller 824 of FIG. 8.

In other examples, additional modules not specifically described above may be implemented using the signal data processor 134, while one or more of the modules discussed above may be omitted from the signal data processor 134, in other embodiments.

Figure 10:
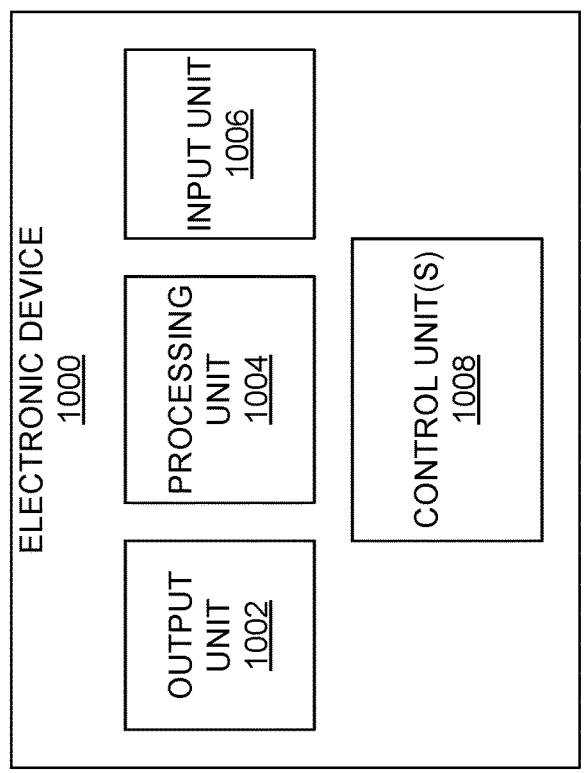
FIG. 10 is a functional block diagram of an electronic device including operational units arranged to perform various operations of the presently disclosed technology.

Turning to FIG. 10, an electronic device 1000 including operational units 1002-1008 arranged to perform various operations of the presently disclosed technology is shown. The operational units 1002-1008 of the device 1000 may be implemented by hardware or a combination of hardware and software to carry out the principles of the present disclosure. It will be understood by persons of skill in the art that the operational units 1002-1008 described in FIG. 10 may be combined or separated into sub-blocks to implement the principles of the present disclosure. Therefore, the description herein supports any possible combination or separation or further definition of the operational units 1002-1008. Moreover, multiple electronic devices 1000 may be employed in various embodiments.

In one implementation, the electronic device 1000 includes an output unit 1002 configured to provide information, including possibly display information, such as by way of a graphical user interface, and a processing unit 1004 in communication with the output unit 1002 and an input unit 1006 configured to receive data from one or more input devices or systems. Various operations described herein may be implemented by the processing unit 1004 using data received by the input unit 1006 to output information using the output unit 1002.

Additionally, in one implementation, the electronic device 1000 includes one or more control units 1008 implementing the operations 602-614 of FIG. 6, as well as other operations described herein. Accordingly, the control units 1008 may include or perform the operations associated with the control circuits 140 of FIG. 1, as well as other control circuits, algorithms, of functions described herein. Further, the electronic device 1000 may serve as the signal data processor 134, as well as any other controller and/or processor discussed above.

Figure 11:
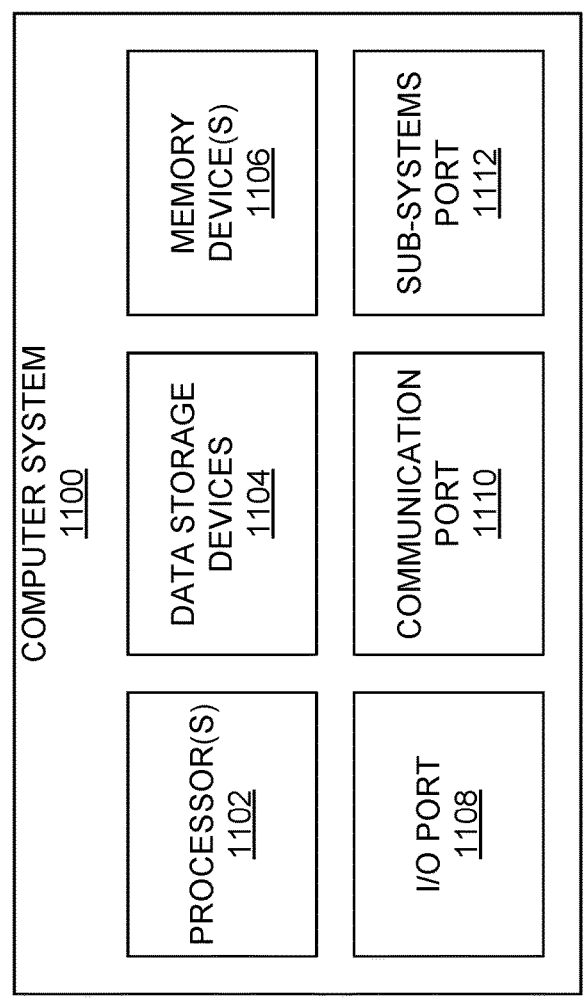
FIG. 11 is an example computing system that may implement various systems and methods of the presently disclosed technology.

Referring to FIG. 11, a detailed description of an example computing system 1100 having one or more computing units that may implement various systems and methods discussed herein is provided. The computing system 1100 may be applicable to, for example, the radar systems 100 and 700, and similar systems described herein. It will be appreciated that specific implementations of these devices may be of differing possible specific computing architectures, not all of which are specifically discussed herein but will be understood by those of ordinary skill in the art.

The computer system 1100 may be a computing system is capable of executing a computer program product to execute a computer process. Data and program files may be input to the computer system 1100, which reads the files and executes the programs therein. Some of the elements of the computer system 1100 are shown in FIG. 11, including one or more hardware processors 1102, one or more data storage devices 1104, one or more memory devices 1106, and/or one or more ports 1108-1112. Additionally, other elements that will be recognized by those skilled in the art may be included in the computing system 1100 but are not explicitly depicted in FIG. 11 or discussed further herein. Various elements of the computer system 1100 may communicate with one another by way of one or more communication buses, point-to-point communication paths, or other communication means not explicitly depicted in FIG. 11

The processor 1102 may include, for example, a central processing unit (CPU), a microprocessor, a microcontroller, a digital signal processor (DSP), and/or one or more internal levels of cache. There may be one or more processors 1102, such that the processor 1102 comprises a single central-processing unit, or a plurality of processing units capable of executing instructions and performing operations in parallel with each other, commonly referred to as a parallel processing environment.

The computer system 1100 may be a conventional computer, a distributed computer, or any other type of computer, such as one or more external computers made available via a cloud computing architecture. The presently described technology is optionally implemented in software stored on the data stored device(s) 1104, stored on the memory device(s) 1106, and/or communicated via one or more of the ports 1108-1112, thereby transforming the computer system 1100 in FIG. 11 to a special purpose machine for implementing the operations described herein. Examples of the computer system 1100 include personal computers, terminals, workstations, mobile phones, tablets, laptops, personal computers, multimedia consoles, gaming consoles, set top boxes, embedded computing and processing systems, and the like.

The one or more data storage devices 1104 may include any non-volatile data storage device capable of storing data generated or employed within the computing system 1100, such as computer executable instructions for performing a computer process, which may include instructions of both application programs and an operating system (OS) that manages the various components of the computing system 1100. The data storage devices 1104 may include, without limitation, magnetic disk drives, optical disk drives, solid state drives (SSDs), flash drives, and the like. The data storage devices 1104 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1106 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1104 and/or the memory devices 1106, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 1100 includes one or more ports, such as an input/output (I/O) port 1108, a communication port 1110, and a sub-systems port 1112, for communicating with other computing or network devices. It will be appreciated that the ports 1108-1112 may be combined or separate and that more or fewer ports may be included in the computer system 1100.

The I/O port 1108 may be connected to an I/O device, or other device, by which information is input to or output from the computing system 1100. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 1100 via the I/O port 1108. Similarly, the output devices may convert electrical signals received from computing system 1100 via the I/O port 1108 into signals that may be sensed as output by a human, such as sound, light, and/or haptics. The input device may be an alphanumeric input device, including alphanumeric and other keys for communicating information and/or command selections to the processor 1102 via the I/O port 1108. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 1100 via the I/O port 1108. For example, an electrical signal generated within the computing system 1100 may be converted to another type of signal, and/or vice-versa. In one implementation, the environment transducer devices sense characteristics or aspects of an environment local to or remote from the computing device 1100, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 1100, such as, physical movement of some object (e.g., a mechanical actuator), heating or cooling of a substance, adding a chemical substance, and/or the like.

In one implementation, a communication port 1110 is connected to a network by way of which the computer system 1100 may receive network data useful in executing the methods and systems set out herein as well as transmitting information and network configuration changes determined thereby. Stated differently, the communication port 1110 connects the computer system 1100 to one or more communication interface devices configured to transmit and/or receive information between the computing system 1100 and other devices by way of one or more wired or wireless communication networks or connections. Examples of such networks or connections include, without limitation, Low-Voltage Differential Signaling (LVDS), Universal Serial Bus (USB), Ethernet, Wi-Fi, Bluetooth®, Near Field Communication (NFC), Long-Term Evolution (LTE), and so on. One or more such communication interface devices may be utilized via the communication port 1110 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 1110 may communicate with an antenna for electromagnetic signal transmission and/or reception. In some examples, an antenna may be employed to receive Global Positioning System (GPS) data to facilitate determination of a location of a machine or another device.

The computer system 1100 may include a sub-systems port 1112 for communicating with one or more other systems or sub-systems to control those systems or sub-systems and/or to exchange information between the computer system 1100 and the systems or sub-systems.

In an example implementation, object sensing information and software and other modules and services may be embodied by instructions stored on the data storage devices 1104 and/or the memory devices 1106 and executed by the processor 1102. The present disclosure recognizes that the use of such information may be used to the benefit of users.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 11 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium; read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the disclosure is not so limited. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A radar system comprising:
   a transmit antenna array to emit a radar beam toward a selected portion of a field of view;
   a vertical receive antenna array comprising a plurality of first antenna elements grouped into first sub-arrays, each of the first sub-arrays to receive scatter signals caused by the radar beam from the selected portion of the field of view;
   a first circuitry to combine the received scatter signals from each of the first sub-arrays into a first combined scatter signal for each of the first sub-arrays, and to digitize the first combined scatter signals into first digitized scatter signals;
   a horizontal receive antenna array comprising a plurality of second antenna elements grouped into second sub-arrays, each of the second sub-arrays to receive the scatter signals;
   a second circuitry to combine the received scatter signals from each of the second sub-arrays into a second combined scatter signal for each of the second sub-arrays, and to digitize the second combined scatter signals into second digitized scatter signals; and
   a signal data processor to digitally process the first digitized scatter signals to generate vertical detection information corresponding to the vertical receive antenna array, to digitally process the second digitized scatter signals to generate horizontal detection information corresponding to the horizontal receive antenna array, and to correlate the vertical detection information and the horizontal detection information to generate detection information for each of a plurality of sub-portions of the selected portion of the field of view.

2. The radar system of claim 1, the transmit antenna array comprising a two-dimensional phased antenna array comprising a plurality of third antenna elements, the at least one of the third antenna elements comprising a patch antenna.

3. The radar system of claim 2, wherein the vertical receive antenna array is positioned orthogonally to the horizontal receive antenna array.

4. The radar system of claim 1, at least one of the first antenna elements and the second antenna elements comprising a patch antenna.

5. The radar system of claim 1, each of the first circuitry and the second circuitry comprising beamforming circuitry to direct each of the first sub-arrays and each of the second sub-arrays toward the selected portion of the field of view.

6. The radar system of claim 5, the beamforming circuitry comprising one of a phase-shifter and a delay element for each of the first and second antenna elements.

7. The radar system of claim 1, further comprising beamforming circuitry to adjust the transmit antenna array to direct the radar beam toward the selected portion of the field of view.

8. The radar system of claim 7, the beamforming circuitry comprising one of a phase-shifter and a delay element for each of a plurality of the third antenna elements of the transmit antenna array.

9. The radar system of claim 8, the signal data processor to perform a Fast Fourier Transform (FFT) across the first digitized scatter signals and across the second digitized scatter signals to generate the vertical detection information and the horizontal detection information.

10. The radar system of claim 1, further comprising a beamforming circuit to cause the transmit antenna array to emit the radar beam toward a next selected portion of the field of view different from the selected portion of the field of view.

11. The radar system of claim 1, the signal data processor to generate the detection information for each of the plurality of sub-portions of the selected portion of the field of view simultaneously.

12. The radar system of claim 1, a number of the plurality of sub-portions being equal to a number of the first sub-arrays multiplied by a number of the second sub-arrays.

13. A method of operating a radar system, the method comprising:
   emitting a radar beam toward a selected portion of a field of view;
   receiving scatter signals caused by the radar beam from the selected portion of the field of view at a vertical receive antenna array comprising a plurality of first antenna elements grouped into first sub-arrays;
   combining the received scatter signals from each of the first sub-arrays into a first combined scatter signal for each of the first sub-arrays
   digitizing the first combined scatter signals into first digitized scatter signals;
   receiving the scatter signals from the selected portion of the field of view at a horizontal receive antenna array comprising a plurality of second antenna elements grouped into second sub-arrays;
   combining the received scatter signals from each of the second sub-arrays into a second combined scatter signal for each of the second sub-arrays;

digitizing the second combined scatter signals into second digitized scatter signals;

digitally processing the first digitized scatter signals to generate vertical detection information;

digitally processing the second digitized scatter signals to generate horizontal detection information; and correlating the vertical detection information and the horizontal detection information to generate detection information for each of a plurality of sub-portions of the selected portion of the field of view.

14. The method of claim 13, the transmit antenna array comprising a two-dimensional phased antenna array comprising a plurality of third antenna elements, the method further comprising phase-shifting a signal provided to at least one of the plurality of third antenna elements to direct the radar beam to the selected portion of the field of view.

15. The method of claim 14, further comprising phase-shifting the signal provided to at least one of the plurality of third antenna elements to direct the radar beam to a second selected portion of the field of view different from the first selected portion.

16. The method of claim 13, further comprising phase-shifting a signal provided to at least one of the first antenna elements of each of the first sub-arrays and a signal provided to at least one of the second antenna elements of each of the second sub-arrays to direct each of the first sub-arrays and each of the second sub-arrays toward the selected portion of the field of view.

17. The method of claim 13, the digital processing of the first digitized scatter signals and the second digitized scatter signals comprising performing a Fast Fourier Transform (FFT) across the first digitized scatter signals and performing the FFT across the second digitized scatter signals.

18. The method of claim 13, the digital processing of the first digitized scatter signals and the second digitized scatter signals to generate the vertical detection information simultaneously and to generate the horizontal detection information simultaneously.

19. The method of claim 13, a number of the plurality of sub-portions being equal to a number of the first sub-arrays multiplied by a number of the second sub-arrays.

20. A radar system comprising:

a transmit phased antenna array to emit a radar beam;

a first beamforming circuit to steer the radar beam toward a selected portion of a field of view;

a vertical receive antenna array comprising a plurality of first antenna elements grouped into first sub-arrays;

a second beamforming circuit to cause each of the first sub-arrays to receive scatter signals caused by the radar beam from the selected portion of the field of view;

a first analog combiner circuit to combine the received scatter signals from each of the first sub-arrays into a first combined scatter signal for each of the first sub-arrays;

a first digitizer circuit to digitize the first combined scatter signals into first digitized scatter signals;

a horizontal receive antenna array comprising a plurality of second antenna elements grouped into second sub-arrays, the horizontal receive antenna array positioned orthogonally to the vertical receive antenna array;

a third beamforming circuit to cause each of the second sub-arrays to receive the scatter signals;

a second analog combiner circuit to combine the received scatter signals from each of the second sub-arrays into a second combined scatter signal for each of the second sub-arrays;

a second digitizer circuit to digitize the second combined scatter signals into second digitized scatter signals; and a signal data processor to digitally process the first digitized scatter signals to generate vertical detection information corresponding to the vertical receive antenna array, to digitally process the second digitized scatter signals to generate horizontal detection information corresponding to the horizontal receive antenna array, and to correlate the vertical detection information and the horizontal detection information to generate detection information for each of a plurality of sub-portions of the selected portion of the field of view, the detection information including a range to an object in the field of view, and angle including azimuth and elevation to the object in the field of view, a velocity of the object in the field of view, or micro-Doppler information of the object in the field of view.

* * * * *